Figure 1:
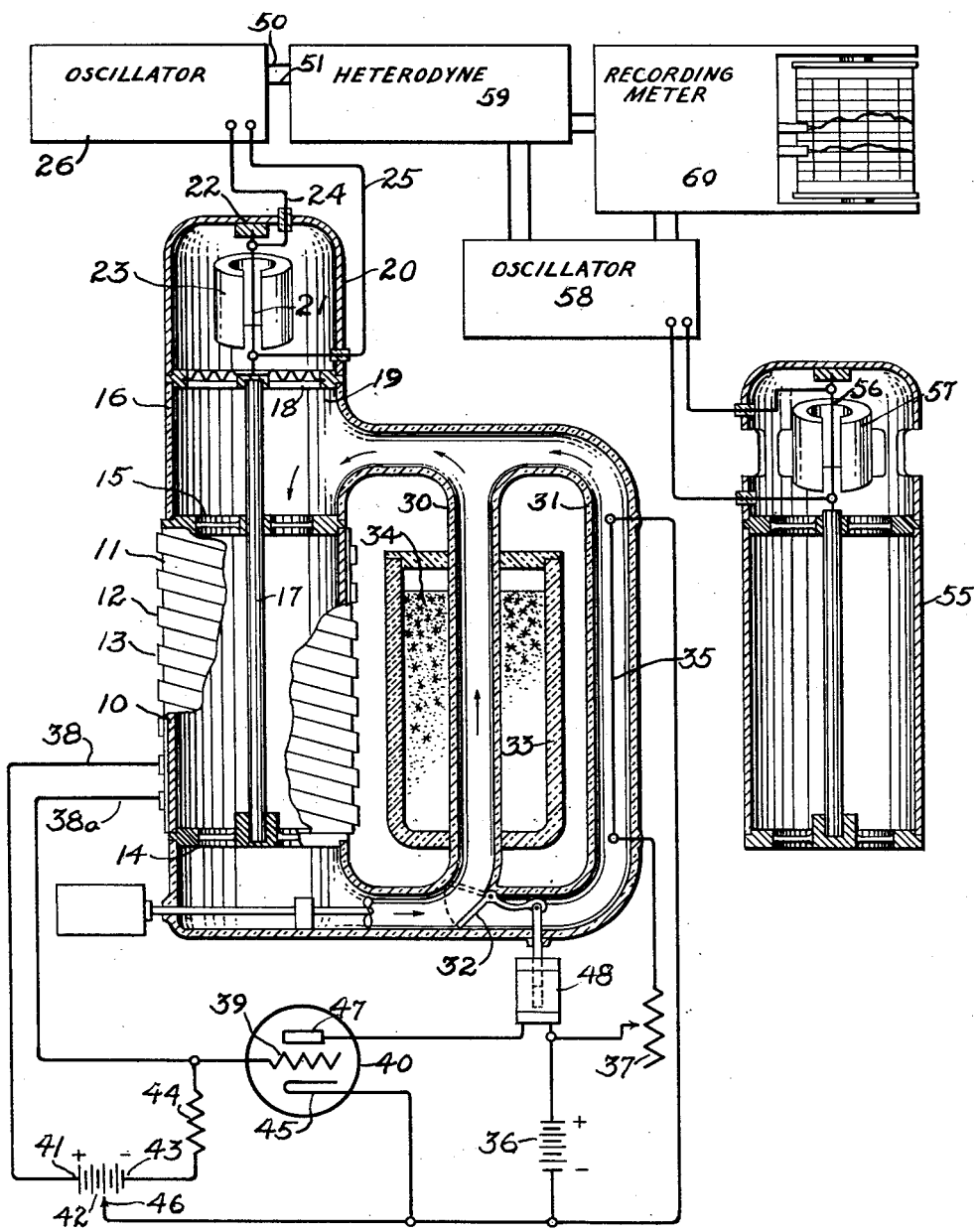

Feb. 20, 1951          F. RIEBER          2,542,944

DEWPOINT METER

Filed April 20, 1945          2 Sheets-Sheet 1

INVENTOR.
FRANK RIEBER
BY

Patented Feb. 20, 1951

2,542,944

UNITED STATES PATENT OFFICE 2,542,944

DEW POINT METER

Frank Rieber, New York, N. Y., assignor to Interval Instruments, Inc., a corporation of New York Application April 20, 1945, Serial No. 589,427

7 Claims. (Cl. 73—17)

This invention relates to devices for accurately measuring the moisture content of air, and more particularly for measuring the dew point of the air.

This invention relates to devices by which the moisture content of the atmospheric air may be measured. The invention may also be used to measure the vapor content of any mixture containing a gas and a vapor, provided the fluid from which the vapor is derived is a conductor of electricity.

The term "dewpoint" is too well known in the art to require definition here. For the purposes of this specification it is sufficient to state that if the surface of a solid, in contact with the air, is cooled below the temperature of the ambient air, a point will eventually be reached at which the moisture in the air will begin to condense upon the surface of the solid. Any method for determining the dewpoint, by noting such condensation, must accordingly consist of the steps of cooling the surface, detecting the first evidences of film formation, and determining the temperature at which the surface first begins to collect such a film. This dewpoint temperature will, obviously, always be below the ambient temperature of the air. Simply stated, a dewpoint measurement tells us directly, without further computation, how much colder a body of air must become before precipitation occurs. Such information is of direct and immediate use in many applications of meteorology.

An object of this invention is to provide an apparatus for measuring the dewpoint which will be extremely accurate, under all conditions of use.

A further object of this invention is to produce an instrument as aforesaid which will hold the accuracy of its calibration for an indefinite period without the necessity for checking or readjustment.

A further object of my invention is to produce an instrument as aforesaid which is capable of satisfactory results at operation temperatures below the freezing point of water.

A further object of my invention is to provide an apparatus as aforesaid which is light, simple, and easy of construction, and adapted to be produced inexpensively in large quantities.

A further object of my invention is to produce an instrument as aforesaid whose indications are furnished in the form of a signal readily transmittable to a distant point for reading or recording.

A further object of my invention is to produce an apparatus as aforesaid capable of detecting, transmitting, and recording the value of the dewpoint continuously, and further, capable of responding with extreme rapidity to any rapid change in the actual value of the said dewpoint.

The patents to Thornwaite 2,240,082, and 2,268,785 depend upon the formation of a film of appreciable thickness, sufficient to have definite optical properties which in such a system requires an appreciable time to form, and lowering of the surface appreciably below the dewpoint. Such a thick film correspondingly requires an appreciable time to evaporate, and a corresponding rise in temperature above the dewpoint. Thus the cycle of above and below the dewpoint is quite appreciable.

Aside from the difficulty caused by a thick film, in the matter of giving an oscillating record, further difficulties are present when measurements must be made below the freezing point of water. At these lower temperatures, not one, but two values of the dewpoint exist. The first value may be thought of as the temperature at which supercooled water turns into vapor. The second value may be thought of as the temperature at which water leaves the surface of ice in the form of vapor. Any apparatus which depends upon the formation of a relatively thick film, will, if operated below the freezing point, determine a dewpoint referred to ice rather than to water. This leads to ambiguities in interpretation for measurements made near to or below the freezing point, which may be avoided if the apparatus is capable of sensing the formation of extremely thin films. Ice, as such, cannot exist until the film is sufficiently fixed to permit the formation of ice crystals. Hence, if operated below the freezing point, an apparatus which is capable of sensing extremely thin film responds only to the water-vapor relationship, and readings taken above and below the freezing point are referred to the same standards of interpretation.

Methods previously used for determining the dewpoint, such as that of, Thornthwaite above discussed, and also of the earlier apparatus by Regnault, depending as they do upon the optical effect of a film, are not capable of sensing the first stages of film formation, and hence are subject to the confusion of the ice-water vapor relationship. These forms of apparatus are also subject to other difficulties which it is the purpose of my invention to overcome. An important difficulty, in this respect, is the necessity for a perfectly polished mirror. The presence of tarnishing, dust, etc., greatly interferes with the performance of the apparatus, particularly in that of Thornthwaite where a photo-electric cell is used to detect changes in the optical path of light due to film formation. Such photoelectric cells, at best, are delicate and difficult to adjust and maintain in operation over a narrowly regulated range of values.

A further difficulty with all previous apparatus is that the indications, when obtained, are either from a visual thermometer or from a thermocouple or similar electrical device, whose electrical output is small, and not suited to the transmission of signals to a distance. If this outfit is amplified, before transmission, the transmitted value is dependent both upon the magnitude of the original signal, and also the degree of amplification, which latter is not capable of precise and continued maintenance within narrow limits.

It is a further object of this invention to provide a new and improved instrument of this general type having a greater degree of sensitivity, accuracy, and reliability.

I have found that in order to insure that the surface on which the film is to be detected shall be kept accurately at the same temperature as the device which measures that temperature, and in order to make certain that both shall be promptly and accurately responsive to the temperature controlling system by which the surface is brought to and maintained at the dew point, it is important that the expansible element by which the temperature is to be measured shall have a very low thermal inertia, and that it shall have a filming surface freely exposed to the ambient air, and an opposed surface freely exposed to the heat control system, the thickness of the material separating them being very small, and the heat conductivity of the expansible member being very high. It is also desirable that no portion of the surface of the element shall be exposed to the ambient air except the filming surface so that the temperature can be kept as accurately as possible under the control of the heat control system.

As a means of detecting the dew point, I prefer to rely upon a particular property of certain insulating films. I have found that certain of such surfaces afford excellent insulators so long as they remain dry, and they will remain dry at any temperature above the dew point, but they show very marked reduction in resistance at the dew point, perhaps because of the absorption into the insulating film, of a minute amount of moisture just as condensation commences. These films at that point have a marked increase in conductivity and the phenomenon is so sensitive and so marked as to furnish an excellent means of determining the dew point, before any film can be detected by optical methods.

As a film sensing means for use in conjunction with my apparatus, I may employ either of two methods of my invention, whereby the formation of a film causes a sharp, readily identified change in an electric circuit.

The first of these methods, which I prefer, consists in the use of the moisture film, formed on an insulating body between two conductive surfaces associated therewith as a conducting path in a circuit which also contains a source of potential and an element responsive to current flow. To accomplish this, I coat the surface of a tubular aluminum member with an extremely thin coating of insulating material, for which purpose I may employ either a baked enamel, or one of the synthetic resins such as Bakelite. Thereafter, I coat the outside of the insulating layer with an electrically conducting material. This coating may be conveniently applied by sputtering or vaporizing metal onto the surface in accordance with well known methods.

I next provide exposed surfaces of the insulating material, extending across short gaps between conducting material, to which surface the formation of even a slight moisture film would impart definitely measurable conductivity. I may provide a surface of this type in various ways, among them being the cutting of a helical groove such as a screw thread, on the surface of the prepared, coated, and sputtered tube, the threads extending through the sputtering and the insulation, and into the metal beneath. In such case, if the sputtered surface and the inner tube be connected in an electric circuit, the condutive path between them will normally have extremely high resistance. However, if a moisture film starts to form on the exposed edges of the dielectric material traversed by the grooves, an immediate and very large increase in electrical conductivity will occur.

Or otherwise, I may provide a helically wound masking strip, placed on the surface of the coated tube before sputtering, and removed afterwards. By this means, I divide the sputtered strip into two electrically separate interlaced helices, separated by helical exposed dielectric surfaces on which the formation of moisture will give rise to surface conduction of electricity.

The film detecting system is the control for the heat control system, which is designed to maintain the temperature of the expansible element at the point where this incipient condensation occurs, or fluctuating very slightly above and below that point. Under favorable conditions this control becomes sensitive enough to change the proportions of the heating and cooling systems to maintain the dew point without carrying the device through a cyclic change of temperature.

The film detecting system will therefore be connected to an electrical system and a heat controlling relay, the constants of the system being so chosen that the relay will positively be operated by the difference in electrical resistance of the detecting film as it reaches the dew point.

The dew point itself is measured direct by measuring the temperature of the expansible member. In order to take advantage, however, of the extreme sensitiveness and accuracy of the film detecting system, it is important that the temperature shall be determined as accurately as possible, from the expansible member itself. In order, moreover, that the reading shall appear in a form which can be directly transmitted to a distance if desired, or which may be directly coupled to electrical recording or computing apparatus, it is desirable that the readings of temperature shall appear as variations in an electrical quantity independent of variations of the voltage or other casual variables in the system itself.

The heat control system broadly includes any system which, in response to the film detecting system, will control the film temperature as we have described. It is preferable, however, to provide both a heating and a cooling system brought into use alternately or in varying proportions, so that average temperature of the expansible member will be maintained more accurately at the dew point.

As an expansible member, I prefer to use a thin walled tube of aluminum, which has an extremely high heat conductivity, a high rate of thermal expansion, and the ability to sustain a highly polished surface without appreciable deterioration from exposure to the atmosphere.

I may detect the expansion and contraction of this tube by mounting it in appropriate relation to a strain gage employing fine wires whose resistance changes with tension, thereby obtaining an electrical indication of considerable magnitude readily convertible into transmissible signals. However, I prefer to use in this connection an apparatus of my invention, shown more fully in my co-pending application Serial No. 520,196, filed January 29, 1944, now U. S. Patent Serial Number 2,469,785. This apparatus consists of a fine wire, so linked to the expansible member that expansion or contraction of the latter will alter the tension in the wire. This wire, when connected to an electric circuit of my invention, is maintained in continuous vibration at its fundamental natural period, the electric circuit being capable of delivering to a signalling circuit alternating current as determined by the frequency of the wire vibration. By this means, I have been able to construct extremely sensitive temperature measuring apparatus, readily responsive to change as small as 0.001° C. While sensitivity of this order is not necessary for dew point measurements, it is available if required. Further advantages of such a system lie in the fact that they hold their calibration extremely well under all conditions; the electric circuits required are simple and require no servicing or adjustment, and the signal delivered is immediately adaptable for transmission, either over land wires or radio, and may be detected and identified at a distant point with extreme precision, unaffected by disturbances in the ether or transmission line.

The invention accordingly comprises an article of manufacture possessing the features, properties and the relation of elements which will be exemplified in the article hereinafter described and the scope of the application of which will be indicated in the claim.

For a fuller understanding of the nature and objects of the invention, reference should be had to the following detailed description taken in connection with the accompanying drawing, in which—

Figure 2:
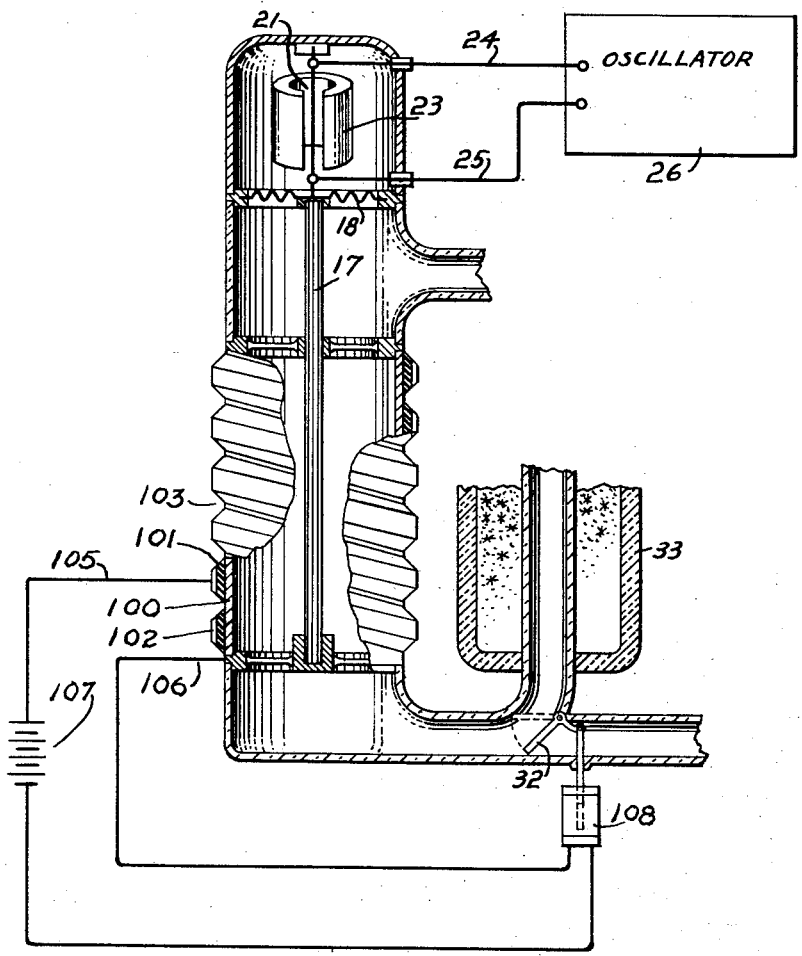

Fig. 1 is a section through a device embodying this invention. Fig. 2 is a fragmentary view showing the modification.

The numeral 10 represents a member having an insulating coating 11 and a conductor 12 in contact with that coating. I prefer to make the member 10 in the form of a tube so that its outer surface or rather the coating thereon, may be exposed to the atmosphere, and its inner surface may form a part of a conduit for carrying a temperature controlling current of air.

This invention works upon the principle of providing a pair of conducting elements in contact with and spaced from each other upon an insulating surface upon which moisture may condense.

In the embodiment shown in this figure, the conducting elements are both carried upon the insulating coating forming interlaced helices 12 and 13 separated by the surface of the insulating coating.

The tube 10 has at its top and bottom, spiders 14 and 15 connecting the tube with a conduit member 16.

The lower spider 14 is attached at its center to a rod 17 having substantially a zero coefficient of expansion. This rod has its upper end attached to a flexible diaphragm 18 which closes an upper opening 19 in the member 16. A cup member 20 is inverted over the diaphragm 18 and a wire 21 is stretched between the top of the cup member at 22 and the diaphragm 18 being insulated at both ends. A magnet 23, C shaped in cross-section, establishes a magnetic field transverse to the wire 21, and electric wires 24 and 25 lead to an oscillator control circuit 26 which maintains the wire in oscillation at a frequency determined by the frequency of the wire.

With this construction, it will be clear that the tension upon the wire 21 will be determined by the difference between expansion of the tube 10 and the relevant portions of the members 16 and 20 on the one hand, and the rod 17 on the other. The members 16 and 20 are preferably made of materials having a very low coefficient of expansion so that the expansion of the tube 10 alone controls the tension on the wire 21.

In this manner, it is not necessary to make the tube 10 with a very high coefficient of expansion because of the sensitivity of the vibrating wire to changes in tension. It is sufficient if it be materially greater than that of the other elements, particularly since the other elements themselves are kept at substantially the same temperature as the tube and rod. The expansion within this limited range is readily taken care of by the yielding of the other parts of the device under the strains imposed.

Since this tension in turn determines the frequency of oscillation of the oscillator 26, it will be seen that that frequency of oscillation itself becomes a measure of the temperature of the tube 10.

Means are provided to maintain the tube 10 at the dew point of the surrounding atmosphere. To this end, the member 16 forms a tight joint with the spiders 15 and 14 and is provided with two auxiliary legs 30 and 31, one of which, 30, is provided with cooling means and the other, 31, is provided with heating means, while a vane 32, controlled by the dew point, moves from a solid line position in Fig. 1 while the tube 10 is in communication with the cooling conduit 30 to the dotted line position in which tube 10 is in communication with the heating conduit 31.

Within this invention, any means may be provided for cooling the cooling conduit, and heating the heating conduit; we here show a chamber 33 surrounding the conduit 30, and containing a cooling medium such as frozen carbon dioxide 34. While the conduit 31 is provided with a heating wire 35 which may be energized by a battery 36 under control of a rheostat 37.

The mechanism for controlling vane 32 by the dew point is as follows:

Electric wires 38 and 38a are connected respectively to the electrodes 12 and 13 and one of these wires 38a is connected to the grid 39 of a vacuum tube 40 whereas the other wire 38 is connected to the positive side 41 of a battery 42. The negative side of this same battery 43 is connected to the grid 39 through a high resistance 44. The cathode 45 of the tube 40 is connected to a mid point 46 of this same battery. The plate of this tube 47 is connected to a solenoid 48 in turn connected to the plus side of the battery 36, the minus side of which is connected to the cathode. With this construction, it will be clear that when the insulation between electrodes 12 and 13 is high, the grid of the tube 40 will be maintained minus by the battery 42 through the resistance 44. As soon, however, as the insulation between the electrodes 12 and 13 is impaired as it will be when a thin film of moisture collects upon it, the flow of current from the point 41 through this reduced insulation will impose a positive potential upon the grid 39 which will permit the flow of current through the solenoid 48. This will energize the solenoid and cause it to operate the vane 32 to cause the flow of air through the leg 31 thereby again warming the tube 10 to the point where the moisture film is evaporated. The sensitiveness of the instrument can be made such that the variation in resistance of the insulating coating will maintain the vane 32 in an intermediate position so that the insulating surface may be maintained at the dew point without substantial fluctuation above or below it.

The temperature of the tube and hence the dew point appears as a function of the frequency of oscillation of the oscillator 26 and the leads 50 and 51 from that oscillator may be used for any form of signalling indicating or recording desired.

In the drawings, I have shown means for measuring the drop in temperature of the dew point below atmospheric temperature. For this purpose, there is provided a second tube 55 exposed to the atmosphere inside and out and having a wire 56 supported under tension from its ends in the field of a magnet 57. This wire in turn is connected to an oscillator circuit 58, similar to 26. This second oscillator system is to measure the temperature of the atmosphere and its constants are preferably so chosen as to respond with the same frequencies of vibration as oscillator system 26, for the same temperature.

The oscillating currents from 26 and 58 are shown connected to a heterodyning circuit 59 whereby a new frequency is produced proportional to the difference between the atmospheric temperature and the dew point.

This new frequency and the atmospheric temperature are shown connected to a recording meter 60 which can thus give the graph of both quantities from which the humid state of the air can be fully determined.

In the form of the invention disclosed in Fig. 2, the filming device comprises a tube 100 connected to a heat control and temperature detecting system such as previously described excepting, however, that there is provided upon the outer surface of the tube 100, a coating 101, which may be formed of substance such as Bakelite and upon the outer surface of this coating there is deposited as for example, by spraying a metallic coating 102 which is thus completely insulated from the tube 100 by the coating 101.

A groove 103 is cut through the coating 102 and the insulating coating 101 to expose the outer surface of the tube 100 which is thus upon the surface separated from the coating 102 by the edge of the insulating coating. In practical form, it is desirable to cut this groove in the form of a spiral so that all portions of the metallic coating 102 will be in contact with each other, and may be connected to a lead 105 by a single terminal. A second lead 106 is connected to the tube 100 and between these two terminals, there is connected apparatus for controlling the temperature of the tube 100 which may take the form of that previously described.

In Fig. 2 I have shown an alternative form of detecting the reduced resistance of the film.

As shown in this figure, a battery 107 imposes a potential upon the coating 102 whereas the other side of the battery is connected through the solenoid 108 to the tube 100 through the terminal 106. In this manner, so long as the resistance of the insulating material 101 is maintained, no current will flow between the coating 102 and the tube 100, but as soon as the edge surface of each of these grooves has its insulation reduced at the dew point, as for example by the incipient deposite of moisture, then the resistance between the outer coating and the tube, measured along the inclined surface of the groove is greatly reduced. Thus the battery 107 may be actuated to operate the solenoid 108 to move vane 32 as in the previous modification.

It will be readily seen that in both modifications, the electrical circuit is designed to actuate the temperature control mechanism by the change of resistance of the surface of the insulating material, and to this end the filming detecting elements are interchangeable whereas the electrical circuits for detecting the film are but representative circuits capable of responding to changes in the high resistance filming surface and to actuate the heating control system thereby.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described by invention, what I claim as new and desire to secure by Letters Patent is:

1. A device for measuring dew point temperature, comprising a metal tube having a temperature coefficient of expansion, an electrical insulating coating on the exterior of said tube, a pair of spaced electrically conducting elements on said insulating coating, a pair of air conduits having communication with the outer ends of said tube, one of said conduits having cooling means and the other of said conduits having heating means, valve means controlling the flow of air from said conduits to said tube, an electrical relay connected to said valve means for actuating the same, electrical circuit means connected to said relay and to said spaced conducting elements responsive to variation in resistance of said insulating coating due to vapor condensing thereon to control said relay, and means connected to the opposite ends of said tube to measure the variations in elongation thereof as an index of the dew point temperature of a vapor surrounding said tube.

2. A device for measuring dew point temperature, comprising a metal tube having a temperature coefficient of expansion, an electrical insulating coating on the exterior of said tube, a pair of spaced electrically conducting elements on said insulating coating, a pair of air conduits having communication with the outer ends of said tube, one of said conduits having cooling means and the other of said conduits having heating means, valve means controlling the flow of air from conduits to said tube, an electrical relay connected to said valve means for actuating the same, electrical circuit means connected to said relay and to said spaced conducting elements responsive to variation in resistance of said insulating coating due to vapor condensing thereon to control said relay, a vibratable wire having its ends connected to the ends of the tube whereby the expansion of the tube varies the tension on the wire, electrical means for maintaining said wire in vibration at its natural frequency, and means for measuring the frequency of the vibration.

3. A device for measuring dew point temperature, comprising a metal tube having a temperature coefficient of expansion, an electrical insulating coating on the exterior of said tube, a pair of spaced electrically conducting elements on said insulating coating, a pair of air conduits having communication with the outer ends of said tube, one of said conduits having cooling means and the other of said conduits having heating means, valve means controlling the flow of air from said conduits to said tube, an electrical relay connected to said valve means for actuating the same, electrical circuit means connected to said relay and to said spaced conducting elements responsive to variation in resistance of said insulating coating due to vapor condensing thereon to control said relay, said tube having an upper closed end, a rod of low thermal coefficient of expansion within said tube having its lower end attached to the lower end of the tube and having its upper end pass through said closed upper end, a wire held in tension between the upper ends of said rod and tube, and electrical means for maintaining said wire in vibration at its natural frequency and means for measuring the frequency of the vibration.

4. A device for measuring dew point temperature, comprising a pair of elements, means for supporting said elements in parallel relation, means for rigidly connecting the pair at one end, means including a vibratable wire connecting the other ends of said elements, one of said elements having a higher thermal coefficient of expansion than the other whereby variation in temperature of said expansion element will vary the tension of the wire, means to vary the temperature of said expansion element, said expansion element having a coating with an insulating surface, a pair of closely spaced conductors in contact with said surface and supported thereby, means to maintain said wire in vibration at its natural frequency, means to measure said frequency and means to measure the electrical resistance between said conductors to control said temperature varying means.

5. A device for measuring dew point temperature, comprising a pair of elements, means for supporting said elements in parallel relation, means for rigidly connecting the pair at one end, means including a vibratable wire connecting the other ends of said elements, one of said elements having a higher thermal coefficient of expansion than the other whereby variation in temperature of said expansion element will vary the tension of the wire, said expansion element being in the form of a tube having a coating with an insulating exterior surface having a pair of closely spaced conductors wound upon and in contact with said surface, a source of air supply of variable temperature and a conduit connecting said supply with the interior of said tube, means to maintain said wire in vibration at its natural frequency, means to measure said frequency and means to measure the electrical resistance between said conductors and thereby to vary said variable temperature.

6. A device for measuring dew point temperature, comprising a pair of elements, means for supporting said elements in parallel relation, means for rigidly connecting the pair at one end, means including a vibratable wire connecting the other ends of said elements, one of said elements having a higher thermal coefficient of expansion than the other whereby variation in temperature of said expansion element will vary the tension of the wire, means to vary the temperature of said expansion element, said expansion element having a coating with an insulating surface, a pair of closely spaced conductors in contact with said surface and supported thereby, means responsive to the electrical resistance between said conductors for controlling the last mentioned means electromagnetic means to maintain said wire in vibration at its natural frequency, including means to generate a current at the frequency of the wire, a standard frequency generator and means for heterodyning said generated frequency with said standard frequency, and means to measure the resultant frequency.

7. A device for measuring dew point temperature, comprising a pair of elements, means for supporting said elements in parallel relation, means for rigidly connecting the pair at one end, means including a vibratable wire connecting the other ends of said elements, one of said elements having a higher thermal coefficient of expansion than the other whereby variation in temperature of said expansion element will vary the tension of the wire, said expansion element being in the form of a tube having a coating with an insulating exterior surface having a pair of closely spaced conductors wound upon and in contact with said surface, means responsive to the electrical resistance between said conductors for varying the temperature of said source of air supply, and a source of air supply of variable temperature and a conduit connecting said supply with the interior of said tube, electromagnetic means to maintain said wire in vibration at its natural frequency including means to generate a current at the frequency of the wire, a standard frequency generator and means for heterodyning said generated frequency with said standard frequency, and means to measure the resultant frequency.

FRANK RIEBER.

REFERENCES CITED

The following references are of record in the file of this patent:

UNITED STATES PATENTS

| Number | Name | Date |
| --- | --- | --- |
| 1,383,233 | Parsons et al. | June 28, 1921 |
| 1,847,653 | Jones et al. | Mar. 1, 1932 |
| 2,015,125 | Polin | Sept. 24, 1935 |
| 2,357,906 | Osterheld | Sept. 12, 1944 |
| 2,381,299 | McCulloch | Aug. 7, 1945 |
| 2,435,895 | McIlvane | Feb. 10, 1948 |

FOREIGN PATENTS

| Number | Country | Date |
| --- | --- | --- |
| 538,287 | Great Britain | July 28, 1941 |